United States Patent [19]

Stute

[11] Patent Number: 5,900,066
[45] Date of Patent: May 4, 1999

[54] HIGH-PRESSURE-TREATED STARCH

[75] Inventor: Rolf Stute, Remseck, Germany

[73] Assignee: CPC International Inc., Bedford Park, Ill.

[21] Appl. No.: 08/837,636

[22] Filed: Apr. 21, 1997

[30] Foreign Application Priority Data

Apr. 23, 1996 [DE] Germany ............... 196 16 210

[51] Int. Cl.$^6$ .................. L08B 30/00; A23L 1/0522
[52] U.S. Cl. ........................................... 127/71; 426/661
[58] Field of Search ........................... 127/71; 426/661

[56] References Cited

FOREIGN PATENT DOCUMENTS

| 3905680 | 8/1990 | Germany | A23L 1/0522 |
| 4117327 | 9/1992 | Germany | A23L 1/0522 |
| 4135665 | 5/1993 | Germany | B02B 5/00 |

OTHER PUBLICATIONS

Thevelein, J.M., et al., "Gelatinization temperature of starch, as influenced by high pressure," *Carbohydrate Research* 93: 304–307 (1981), no month avail.

Muhr, A.H., et al., "Effect of Hydrostatic Pressure on Starch Gelatinization," *Carbohydrate Polymers* 2: 61–74 (1982), no month avail.

Vainionpaa, J., et al., High Pressure Gelatinization of Barley Starch at Low Moisture Levels and Elevated Temperature, Stärke 45: 19–24 (1993), no month avail.

HIBI, Y. et al., "Effect of High Pressure on the Crystalline Structure of Various Starch Granules," *Cereal Chemistry* 70(6): 671–676(1993), no month avail.

*Carbohydrate Polymers* 2:91–102 (1982), no month avail.

*Primary Examiner*—David Brunsman
*Attorney, Agent, or Firm*—Norris, McLaughlin & Marcus

[57] ABSTRACT

A process of preparing foods using granular pregelatinized starch produced by high-pressure at a pressure form 350 MPa to 800 MPa and a temperature of –5 C. to 45 C. The starch can be treated with high pressure within the food product itself, and the food product may be hermetically sealed in a retail package during the pressure treatment.

4 Claims, No Drawings

HIGH-PRESSURE-TREATED STARCH

FIELD OF THE INVENTION

The invention relates to the use in foods of granular pregelatinized starch produced by high-pressure treatment.

BACKGROUND OF THE INVENTION

Starch pastes or gelatinized starches are generally produced by heating aqueous starch suspensions, i.e., those containing sufficient water excess, at temperatures above the so-called gelatinization temperature. This gelatinization temperature is dependent on the type of starch, and is generally markedly above 50° C. The starch granules which occur as discrete partially crystalline particles swell intensely in this process. While some of the starch polymers (in particular the amylose) go into the solution, the insoluble, swollen, amylopectin-rich particles produce a matrix, which can no longer be separated into individual particles by conventional techniques. Accordingly, the physical properties of the starch pastes or gels thus obtained are determined by this matrix of dissolved amylose and swollen particles.

During the drying, and in particular during the roller drying which is preferably used for the production of gelatinized starches, the structure present in the pastes is further destroyed. In the gelatinized starches thus obtained, the granular structure is completely destroyed at the latest by the grinding of the film taken off from the roller. However, gelatinized starches produced in this manner are cold-swelling, in contrast to native starches.

In the light of this background, two processes have been developed, by means of which destruction of the granule shape and size caused by the swelling can be prevented, but nevertheless pregelatinization, i.e., cold swelling properties, of the starch granules can be achieved. The starches thus obtained are called "granular cold-water-swelling starches" (GCWS starches) and have special properties because of their granular character.

These granular cold-water-swelling starches are either produced by pregelatinization during spray-drying or by heating in alcohol-water mixtures. In the first process, the drying process follows the pregelatinization process so rapidly that swelling and aggregation of the granules is prevented. In the alcohol-water mixtures, the water content is sufficient for a complete gelatinization, but, at the same time, the alcohol content is high enough to prevent swelling.

A particular property of such GCWS starches is, for example, that very smooth pastes are retained therefrom, a property which is of interest particularly in the production of low-fat systems, i.e., in systems in which fat is fully or partially replaced by starch. It is thought that the granular character of these starches, which simulates fat droplets, is essential for this application.

Granular starch pastes and gels containing granular pregelatinized starch granules today cannot be produced directly, but can be produced only by the processes described above, in which they are obtained as pulverulent dry products. In this context, the above mentioned swelling which begins immediately in the presence of excess of water is, of course, one reason, but not the principal reason, why it is possible to produce GCWS-starches only by these specific processes. An even more critical fact is that the individual starch granules present in a starch suspension gelatinize, i.e., swell, at different temperatures. Usually, the last granules of a suspension only gelatinize at a temperature about 10° C. above that of the beginning of gelatinization. This means that a uniform gelatinization can never be achieved, not even with an extremely precise temperature control.

Pastes of native starches produced in the conventional manner by heating in excess of liquid are, depending on the type of starch, clear (e.g., potato starch or waxy maize starch) or are opaque to a greater or lesser extent (e.g., maize starch), but, in comparison with a finely dispersed emulsion containing fat droplets, they are always transparent. In order to obtain a higher "whiteness power" in the case of starch-based fat substitutes, a number of processes have been proposed. Products obtained by these processes can be classified as so-called "microparticulates," i.e., discrete particles of approximately the size of the fat droplets present in emulsions.

A number of similar products are described in the literature and patent literature. These products share the property that the crystalline parts of the starch granule were enriched. Retention of a certain crystallinity is therefore essential for (starch-based) microparticulates. (In addition, protein- and cellulose-based products of this type have also been developed.)

However, because of the particular properties of pastes containing pregelatinized, restricted swollen starch granules (and furthermore still partially crystalline), there is great interest in producing pastes of this type directly, and not via spray-drying or via an alcohol-water treatment.

Surprisingly, it has now been found that this can be achieved. Moreover, pastes of this type can be produced directly in a very simple manner, by using high pressures.

The high-pressure treatment of starch is known in principle.

In *Carbohydrate Research* 93: 304–307 (1981), the effect of high pressure on the gelatinization temperature of starch has been investigated. Up to about 1500 atm, the gelatinization temperature is displaced upwards by increase in pressure by 3–5° C./100 atm. Pressures higher than 2500 atm could not be investigated in this study.

In *Carbohydrate Polymers* 2: 61–74 (1982), microscopic and DSC (differential scanning calorimetry) studies report the effect of pressure in the range from 200–1500 MPa on the gelatinization of wheat starch and potato starch. In contrast to the publication above, the hydrostatic pressure is said to decrease the gelatinization temperature. Except for the specimens containing little water, there is said to be no great effect of pressure on the product properties (staining, behavior under the polarization microscope, later gelatinization at atmospheric pressure).

This latter finding is confirmed in *Carbohydrate Polymers* 2: 91–102 (1982), according to which a slight increase in the gelatinization temperature was observed only at the beginning, which then remained constant in the pressure range 150–250 MPa, and which decreased slightly at higher pressures up to 400 MPa.

Further studies, such as those described in *Stärke* 45: 19–24 (1993), carried out in a DSC apparatus with barley starch and potato starch at low water contents (10–34%) and high temperatures (50–250° C.), show that, under these conditions, higher enthalpy values are required for gelatinizing the starch.

From these partly contradictory literature data, which furthermore are only based on studies carried out with microquantities, few conclusions can be drawn for the use of high-pressure-treated starches in industrial practice.

SUMMARY OF THE INVENTION

A process of preparing foods using granular pregelatinized starch produced by high-pressure (higher than 4000 bar) treatment. Cereal and legume starches are suitable, which may include wheat, corn, tapioca, and pea starches. The starch can be treated with high pressure within the food product itself, and the food product may be hermetically sealed in a retail package during the pressure treatment.

DETAILED DESCRIPTION OF THE INVENTION

It has now been found that a granular, pregelatinized starch can be produced by high-pressure treatment. Such starch is outstandingly suitable for use in foods, in particular in products having a creamy consistency, in particular in reduced-fat systems. Starch products of this type can preferably be used in low-fat emulsions, for example in bread spreads, dressings, salad mayonnaises, dips, etc.

In addition to the microparticulate character, the high-pressure treatment can also ensure a certain crystallinity, and, by appropriate choice of the pressure and the starch/water ratio, this residual crystallinity can be adjusted as desirable.

High pressure in general, and also for the purposes of the present invention, means a pressure higher than 4000 bar=4 kbar=400 MPa. The minimum pressure required varies somewhat for different starches, but, for most starches, for example maize starch and wheat starch, is about 500 MPa, and for potato starch about 800 MPa. In currently customary high pressure food processing plants, it is scarcely possible to achieve a pressure of 900 MPa, so that for the purposes of the present invention, preferably, in particular in the case of wheat starch and maize starch, a pressure in the range 350–700, preferably 450–650, MPa is used in order to obtain a granular pregelatinized starch.

High-pressure-treated starches are characterized by rapid retrogradation in comparison with thermally treated starches. This property, in addition to the incomplete loss of crystallinity, is essential for the application properties of high-pressure-treated starch.

The high-pressure treatment can generally be carried out in a temperature range from −5 to +45° C., preferably in a range from −2 to 30° C. Therefore, at room temperature, the range 15–25° C. can readily be employed, if other criteria do not make a lower or higher temperature necessary. It is important that the high pressure treatment takes place below the thermic gelatination temperature.

Suitable starches are, in particular, cereal starches and legume starches, preferably wheat starch, corn starch, tapioca starch or pea starch.

The high-pressure treatment can be carried out at relatively high starch concentration; for example, in aqueous suspension at high pressure in a 10–50% dry substance, preferably 15–35% dry substance.

This offers the opportunity of treating the starch in the food product itself.

Furthermore, this offers the opportunity of adding the native starch to the food prior to the pressure treatment and of packaging the food before the subsequent pressure treatment, preferably a hermetically sealed retail package. Thus the high-pressure treatment of the starch is carried out until it is in the sealed package ready for sale which means particular advantages, with respect to product shelf life to improved keeping quality, i.e., a lower risk of deterioration.

The product properties can, furthermore, be modified by using a high-pressure-treated starch together with a conventional starch. This embodiment of the invention is of particular interest if the high-pressure treatment of the starch is carried out in the food system. In this case, a pressure sensitive starch can be combined with a more pressure-resistant starch, which is not significantly changed during a high-pressure treatment. The more pressure-resistant starch can be ungelatinized root or tuber starch, in particular potato starch or canna starch, which is not significantly changed at the applied pressure.

The invention offers particular advantages. By means of the high-pressure treatment, the starch granules are very uniformly gelatinized and, by the choice of pressure and time and the amount of water in the system, the degree of gelatinization and the extent of swelling can be controlled specifically in wide ranges, so that the paste properties (viscosity, creaminess, gel formation, etc.) can therefore be specifically adapted to the requirements of the respective food.

Because the gelatinization can also be performed at low temperatures, i.e., at temperatures of 0° C. and below, the invention can also be practiced with food products which remain in the cold chain.

Different starches can be used in the process, for example mixtures of starches which can be gelatinized at a certain high pressure together with more pressure-resistant starches, so that pastes are obtained which, beside pregelatinized starch granules, also contain ungelatinized starch. Pastes of this type show rethickening properties upon heating dependence upon the proportion of ungelatinized starch granules.

The invention gains particular importance in the production of reduced-energy foods, because fat can be replaced which, per se, means a reduction in calories. Furthermore, the lower digestibility of the starch is reduced depending upon the degree of gelatinization which can be adjusted by the processing conditions. In the past, the term "resistant starch" was chosen for starches with reduced digestibility. Starches or starch fractions having reduced digestibility therefore have particular importance, since they have the same function in the digestive tract and show the same effects as pectin, cellulose, gums, etc. of vegetable origin, which are known as "dietary fiber." For a fat substitute or mimetic, this is a particular advantage, since the conventional "dietary fibers" (of vegetable origin) cannot be added generally to foods without unacceptably changing the properties of the foods.

The application of the invention for the high-pressure treatment of hermetically sealed packages, for example pouches, tubes, etc., has the further advantage that the foods produced in this manner are already pasteurized and can be kept and are securely packaged up until consumption.

The invention is described in more detail with reference to the Examples below, which are not meant to be limiting in any way whatsoever. Examples 2 and 3 were prepared in comparison to DE-A 2305494, where the starch hydrolysis product SHP was used as fat substitute.

EXAMPLE 1

Milk/edible oil emulsion 500 g of edible oil and 1500 ml of milk were homogenized for 2 minutes in an Ultraturrax at 7000 rmp and, after addition of 100 g of wheat starch and sealing of the mixture into a polyethylene (PE) pouch by welding, the mixture was treated at high pressure for 15 minutes at 0° C. and 600 MPa.

A milky-white, slightly creamy emulsion is obtained, which showed no signs of separation even after four weeks.

This Example shows that emulsions containing starch gelatinized in a granular manner can be produced directly in hermetically sealed containers.

EXAMPLE 2

Salad mayonnaise 240 g of edible oil and 60 g of egg yolk were homogenized as in Example 1,200 g of wheat starch, 450 ml of water, 30 g of fructose, 20 g of hot mustard and 8 g of common salt were added, the mixture was briefly homogenized once more and, after being sealed into a polyethylene (PE) pouch by welding, was treated at high pressure for 30 minutes at 20° C. and 600 MPa. The formula of this salad mayonnaise is virtually identical to a salad mayonnaise produced according to DE 2305494 using starch hydrolysate as fat substitute.

The salad mayonnaise produced in this way has a calorie content of 315 kcal/100 g, in comparison with a commercial salad mayonnaise, whose calorie content is about 730 kcal/100 g. It is thus in the same order of magnitude as the salad mayonnaise produced with the starch hydrolysis product SHP in accordance with DE 2305494 (272 kcal/100 g).

EXAMPLE 3

Chocolate bread spread 50 g of wheat starch and 150 ml of water were treated at high pressure for 15 minutes at 0° C. and 600 MPa, and the creamy paste thus obtained was mixed with 56 g of defatted cocoa mass, 40 g of sugar and 104 g of glucose syrup (79° Brix).

The Nutella®—like bread spread thus obtained is characterized by a pleasantly creamy, smooth sensation in the mouth. The calorie content is 177 kcal/100 g in comparison with a commercial bread spread (Nutella®) having about 530 kcal/100 g. It is thus in the same order of magnitude as a bread spread produced in accordance with DE 2305494 using a starch hydrolysate as fat substitute (210 kcal/100 g).

The water activity ($a_w$) value is 0.90, likewise in the same order of magnitude of the products based on starch hydrolysates.

This example shows that starch-based bread spreads of comparable quality and properties may be produced directly (and thus much more simply) than using the long-known starch hydrolysis products which always have to be first heated and then cooled down over many hours to obtain a creamy consistency.

EXAMPLE 4

Chocolate bread spread 630 ml of water, 630 ml of milk (fat content 3.5%), 500 g of fructose, 250 g of defatted cocoa powder, 50 g of butter, 2 g of vanillin and 400 g of wheat starch were mixed and, after being sealed into a polyethylene (PE) pouch by welding, were treated at high pressure for 15 minutes at 75° C. and 600 MPa.

The bread spread obtained has a smooth, creamy consistency comparable to that in Example 3. The calorie content is 284 kcal/100 g.

Example 4 shows that at high sugar contents, in some circumstances, higher temperatures are necessary for the production of a product containing granular pregelatinized starch.

EXAMPLE 5

292 g of corn starch and 586 ml of milk (fat content 1.5%) were mixed and treated at high pressure at 600 MPa (15 minutes and 14° C.). The creamy paste thus obtained was then homogenized with 667 g of honey, 71 g of cocoa powder (defatted), 34 g of skimmed milk powder, 140 g of fructose, 140 g of finely ground hazelnuts and 60 g of butter.

The bread spread obtained has good spreadability and resembles in consistency that of Example 3 and 4. This Example shows that starches other than wheat starch, in this case corn starch, can also be used.

EXAMPLE 6

300 g of wheat starch and 600 ml of water were mixed and treated at high pressure at 600 MPa (15 minutes and 20° C.). 700 g of honey, 48 g of butter, 54 g of cocoa powder and 160 g of soya powder were then mixed in.

The bread spread resembles those produced in Example 3, 4 and 5, and shows that comparable products may also be produced using soya protein as protein base.

The invention now being fully described, it will be apparent to one of ordinary skill in the art that many changes and modifications can be made thereto without departing from the spirit or scope of the invention as set forth herein.

What is claimed is:

1. A process for preparing pregelatinized starch for use in food product which process comprises the production of granular pregelatinized starch by high pressure treatment of starch together with a more pressure-resistant starch at a pressure from 350 MPa to 800 MPa and at a temperature from −5 C. to 45 C.

2. The process according to claim 1, wherein said more pressure-resistant starch is an ungelatinized root or tuber starch.

3. The process according to claim 1, wherein said root or tuber starch is selected from a group consisting of potato starch and canna starch.

4. The process according to claim 1, wherein said starch together with a more pressure resistant starch are treated at high pressure in said food product.

* * * * *